J. W. CLOUSTON.
DRYING APPARATUS FOR FISH AND THE LIKE.
APPLICATION FILED FEB. 4, 1911.
1,033,153.
Patented July 23, 1912.
2 SHEETS—SHEET 1.
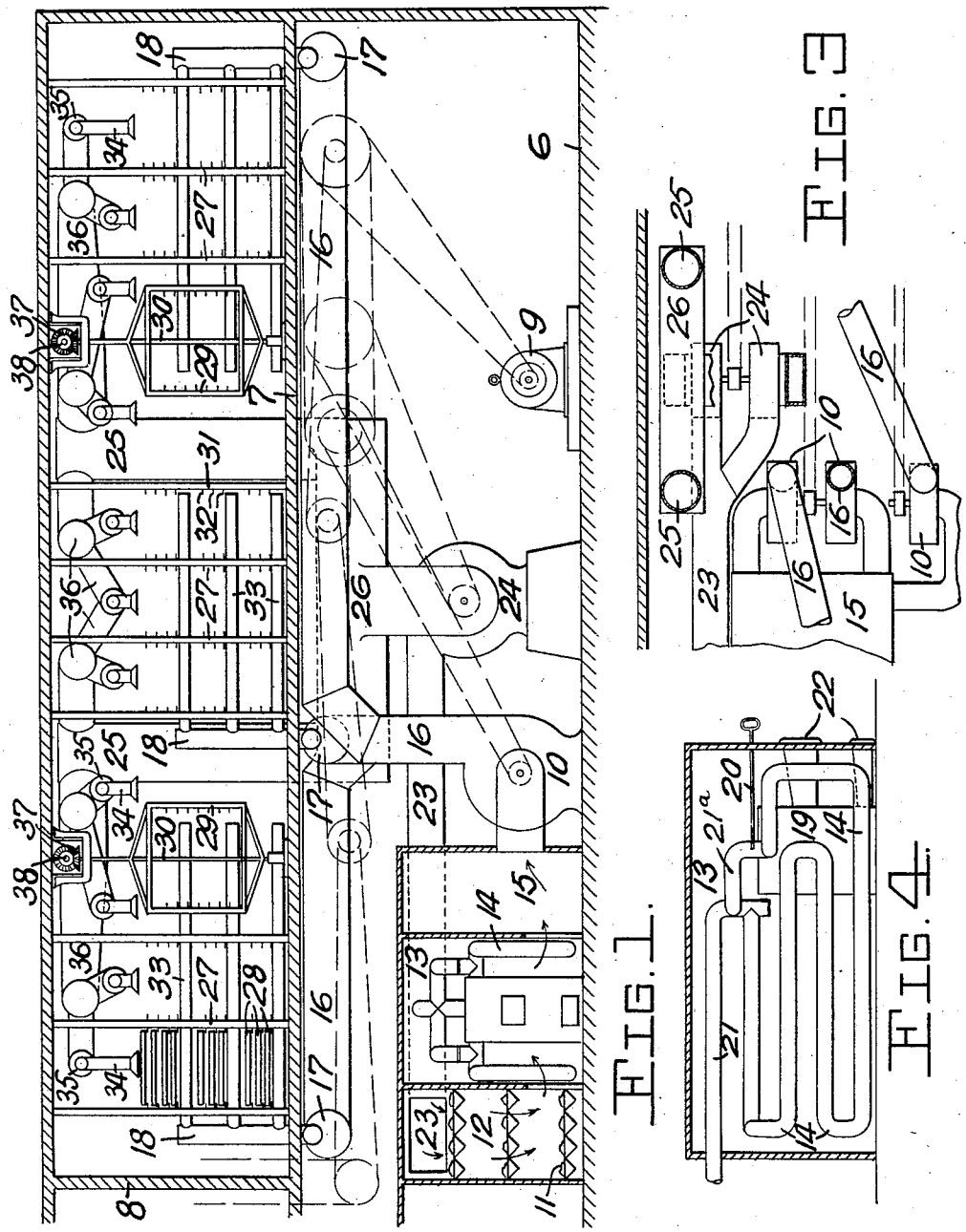
WITNESSES
INVENTOR
JOHN W. CLOUSTON.

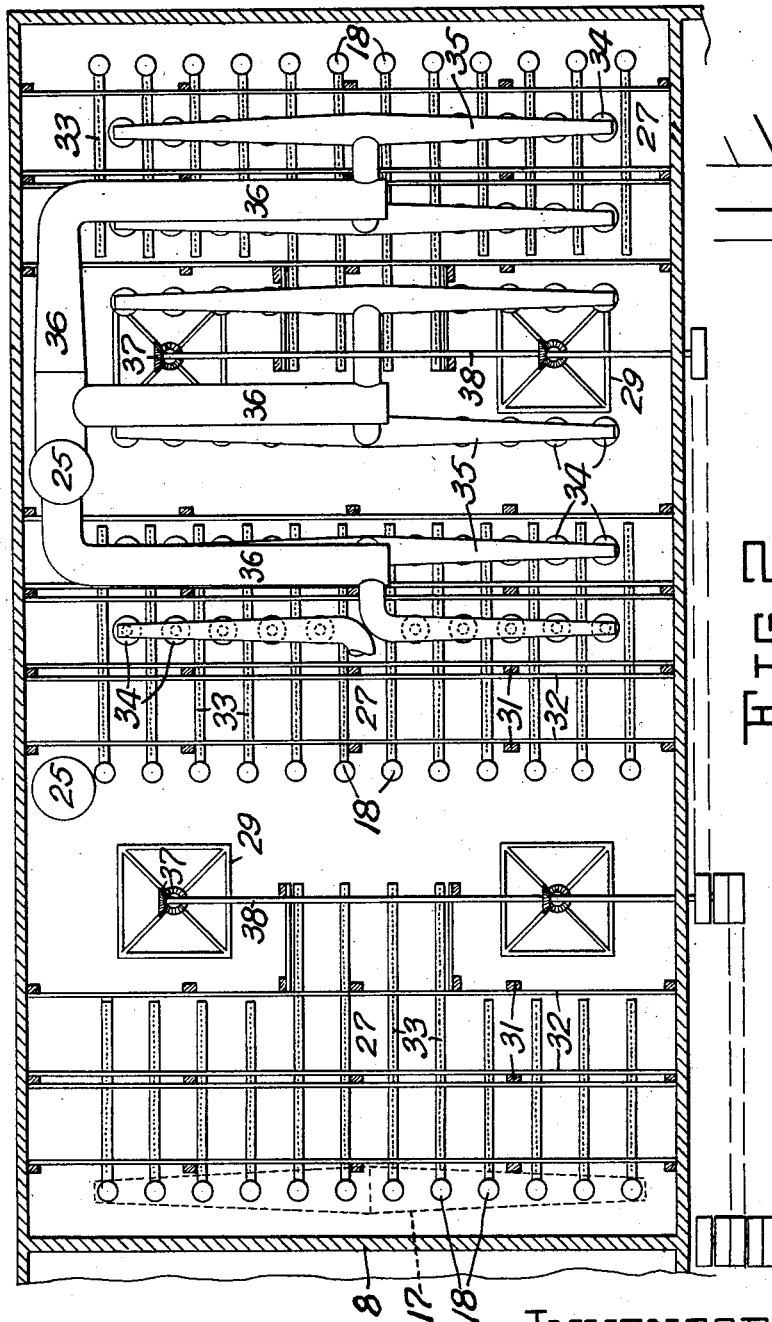

UNITED STATES PATENT OFFICE.

JOHN WILLIAM CLOUSTON, OF ST. JOHN'S, NEWFOUNDLAND.

DRYING APPARATUS FOR FISH AND THE LIKE.

1,033,153.  Specification of Letters Patent.  Patented July 23, 1912.

Application filed February 4, 1911. Serial No. 606,493.

*To all whom it may concern:*

Be it known that I, JOHN WILLIAM CLOUSTON, of the city of St. John's, Newfoundland, have invented certain new and useful Improvements in Drying Apparatus for Fish and the Like, of which the following is a full, clear, and exact description.

My invention relates to improvements in driers for fish and the like, and the object is to provide means for maintaining a rapid circulation of hot dry air over and through the substance to be dried which is spread out thinly over a large area.

To accomplish this object I provide a heating furnace, a chemical drying apparatus, and a series of fans for creating and maintaining a circulation in the drying room. The substance to be dried is spread out thinly on a large number of trays which are compactly arranged in cases through which perforated air pipes pass. A system of suction pipes is arranged on the ceiling which is connected to a fan adapted to return the moisture laden air to the heating and chemical drying apparatus.

In installing an apparatus of this kind, it is advisable to use a number of entirely independent units in order that one or more units may be recharged, cleaned or repaired while the others are in operation, thus providing for a continuous and uniform output. In the drawings only a single unit is shown but it will be understood that this unit may be duplicated as many times as required in each installation.

Referring to the drawings:—Figure 1 is a sectional elevation of a building showing the relative positions of the parts. Fig. 2 is a plan view of the upper floor showing the arrangement of drying racks and air flues. Fig. 3 is a partial plan of the lower floor showing the arrangement of the fans. Fig. 4 is a longitudinal section of the furnace room. Fig. 5 is a perspective detail view of the drying racks.

In these drawings, 6 designates the lower and 7 the upper floor of a building in which the drying apparatus is installed. The lower floor may be undivided but the upper floor is preferably divided into a number of rooms by partitions 8, each of which rooms contains a single drying unit similar to the one illustrated. On the lower floor 6 is located a motor 9 or other source of power, which is suitably connected to the various moving parts of the drying unit. Near the motor 9 is a battery, preferably of three blowers 10, which draw air through a suitable chemical drying agent 11, located in a chamber 12 through a heating room 13 containing a heating coil 14, and finally through an equalizing chamber 15. These blowers then discharge the hot dry air through individual mains 16 to headers 17, from which branch risers 18 extend through the floor 7 into the drying room. The air heating coil 14, as will be seen in Figs. 1 and 4, is inserted in the smoke flue 21 of the furnace 19 and may be cut out when lighting the fire by opening the dampers 20, to give direct connection to the smoke stack through the short connecting pipes 21$^a$. When the dampers 20 are open, the smoke from the furnace naturally takes the shortest course to the flue 21 which is through the pipes 21$^a$, but when the dampers 20 are closed the heat and smoke are compelled to travel through the heating coil 14. The firing and draft doors 22 of the furnace are extended through to the front of the chamber 13, as are the dampers, in order that perfect control may be had without opening the chamber and consequently reducing the temperature. Air is supplied to the drying chamber 12 through a pipe 23 into which the exhaust fans 24 discharge. These exhaust fans draw air down from the drying room through a pair of large downtake pipes 25 which are connected by a header 26 to the fans 24.

On the upper floor 7 are located the stationary drying racks 27 in which the fish or other material to be dried is spread out thinly over a large area on trays 28. Similar racks 29 are mounted on vertical spindles 30 which are revolved in any suitable manner from the motor 9. All of these racks consist essentially of uprights 31 to which angle iron tray slides 32 are bolted at regular intervals. Perforated pipes 33 project horizontally from the risers 18 and extend between the trays at different levels so as to divide the same into series. Above the tray racks are a number of air collectors 34 having flaring mouths opening downwardly. The collectors lead to headers 35 which are in turn connected by pipes 36 to the downtakes 25. It will be noted in Fig. 2 that the headers 35 taper toward each end and are connected at their centers to the pipes 36. This arrangement, as is well known, will produce a substantially equal suction at all the collectors. The hot air headers 17 are tapered in the same manner and for the same reason.

The preferred manner of driving the revolving racks is by means of miter gears 37 connecting the vertical shafts 30 with overhead shafts 38 so that the racks are arranged in series. The overhead shafts are suitably driven by the motor 9. The purpose of the revolving racks is to agitate the air in a lateral direction so that hot dry air escaping from the perforated pipes 33 will not enter the collectors immediately above but will be diverted to one side and thus pass over a greater area of fish. A further advantage is that this lateral agitation is very effective in sweeping away the heavy layer of damp air which tends to collect over the fish and which is one of the causes of the salt crust which is sometimes found on the outside of dried salt fish.

The operation is so simple as to be obvious. The blowers 10 supply hot dry air to practically every portion of the drying room, so that all the fish receive a uniform supply. The air readily absorbs the moisture in the fish and is drawn thus laden into the collectors 34 and returned by the exhaust fans 24 to the heating and drying chambers, through which it again passes to the blowers 10. A rapid circulation of air is thus effected which, combined with the lateral motion of the air, induced by the revolving racks, prevents any stagnation or accumulation of damp air in close proximity to the fish.

Having thus described my invention, what I claim is:—

1. A drying apparatus for fish and the like comprising a drying room, means for circulating air through said room, a series of stationary drying racks, and revoluble drying racks intermediate the stationary racks arranged to agitate the air circulating within the room.

2. A drying apparatus for fish and the like comprising a drying room, an air drying, heating and circulating device, a series of stationary racks in the drying room, and a series of revoluble racks intermediate the stationary racks.

3. A drying apparatus for fish and the like comprising a drying room, an air drying, heating and circulating device, a series of drying racks in the drying room, a plurality of air distributers located at regular intervals through said racks, a plurality of air collectors located at regular intervals over said racks, tapered headers for said air distributers and collectors arranged to give an equal discharge and collection of air at all parts of the drying room, and means for agitating the air circulating through the racks.

4. In a drying apparatus for fish and the like, a drying room, a series of stationary racks therein, a series of revolving racks, an air drying and heating device, a blower for each stationary rack, a series of perforated distributing pipes in the stationary racks, a plurality of air collectors over all the racks, and fans for drawing damp air into said collectors and returning same to the drying and heating device.

In witness whereof I have hereunto set my hand in the presence of two witnesses.

JOHN WILLIAM CLOUSTON.

Witnesses:
 ROBERT GEAR MACDONALD,
 EDW. SCOPLEN.

---

Copies of this patent may be obtained for five cents each, by addressing the "Commissioner of Patents, Washington, D. C."